United States Patent [19]

Stewart et al.

[11] Patent Number: 5,337,068

[45] Date of Patent: Aug. 9, 1994

[54] FIELD-SEQUENTIAL DISPLAY SYSTEM UTILIZING A BACKLIT LCD PIXEL ARRAY AND METHOD FOR FORMING AN IMAGE

[75] Inventors: Roger G. Stewart, Neshanic Station; William R. Roach, Rocky Hill, both of N.J.

[73] Assignee: David Sarnoff Research Center, Inc., Princeton, N.J.

[21] Appl. No.: 12,981

[22] Filed: Feb. 1, 1993

Related U.S. Application Data

[63] Continuation of Ser. No. 455,195, Dec. 22, 1989, abandoned.

[51] Int. Cl.$^5$ ............................................. G09G 3/36
[52] U.S. Cl. ....................................... 345/88; 345/102
[58] Field of Search ................... 345/87, 88, 90, 92, 345/94, 102; 348/761, 766, 790, 792, 793

[56] References Cited

U.S. PATENT DOCUMENTS

| | | | |
|---|---|---|---|
| 3,703,321 | 11/1972 | Castellano | 350/150 |
| 4,097,128 | 6/1978 | Marsumoto et al. | 350/335 |
| 4,597,160 | 7/1986 | Ipri | 29/571 |
| 4,652,851 | 3/1987 | Lewin | 340/784 |
| 4,661,890 | 4/1987 | Watanabe et al. | 313/488 |
| 4,720,706 | 1/1988 | Stine | 340/783 |
| 4,738,514 | 4/1988 | Stewart | 350/332 |
| 4,739,320 | 4/1988 | Dolinar et al. | 340/752 |
| 4,742,346 | 5/1988 | Gillette et al. | 340/793 |
| 4,758,818 | 7/1988 | Vatne | 340/701 |
| 4,766,430 | 8/1988 | Gillette et al. | 340/793 |
| 4,770,500 | 9/1988 | Kalmanash et al. | 350/347 |
| 4,772,885 | 9/1988 | Uehara et al. | 350/345 |
| 4,797,594 | 1/1989 | Sigai et al. | 313/488 |
| 4,799,050 | 1/1989 | Prince et al. | 350/345 |
| 4,843,381 | 6/1989 | Baron . | |
| 4,907,862 | 3/1990 | Sunkola | 350/345 |
| 4,924,215 | 5/1990 | Nelson | 340/784 |
| 4,958,915 | 9/1990 | Okada et al. | 340/784 |

FOREIGN PATENT DOCUMENTS

| | | | |
|---|---|---|---|
| 0179914 | 7/1989 | Japan | 340/784 |
| 2172733 | 9/1986 | United Kingdom . | |

OTHER PUBLICATIONS

"Flat Fluorescent Lamp of LCD Back Light". K. Hinotani et al., Conf. Rec. of 1988 Int'l Display Research Conf., IEEE, Oct. 4-6, 1988.

"Manufacturing hurdles challenge large-LCD developers" IEEE Spectrum, Sep. 1989, pp. 36-40.

"LCD projector enlarges Image for wide screens", IEEE Spectrum, Aug., 1989, p. 19.

"High-Resolution Full-Color LCDs Addressed by Double-Layered Gate Insulator a-SI TFTs", M. Katayama, et al., SID 88 Digest, pp. 310-313.

"A Full-Color Field Sequential LCD Using Modulated Backlight", H. Hasebe, S. Kobayashi, SID 85 Digest, pp. 81-83.

"Liquid Crystal Apparatus for Converting Black and White CRT Display into Colored Display", A. N. Brinson and A. D. Edgar, IBM Tech. Bulletin vol. 22, No. 5, Oct. 1979.

*Primary Examiner*—Richard Hjerpe
*Assistant Examiner*—M. Fatahi Yar
*Attorney, Agent, or Firm*—W. J. Burke

[57] ABSTRACT

A back-lighted color LCD display is formed by placing a single matrix of liquid crystal devices (LCDs) over a bank of red, green and blue fluorescent lamps. The LCD matrix is operated to sequentially form separate red, green and blue images synchronous with the illumination of the respective red, green and blue lamps. The flashing of the sequential red, green and blue images is perceived as a color image. The images are scanned, one line at a time, onto the LCD matrix. The bank of fluorescent lamps includes several lamps of each color which are arranged in parallel with the lines of the LCD matrix. The different lamps of each color are activated in synchronism with the scanning of the LCD matrix. Each LCD in the matrix includes a rapidly varying liquid crystal material, sandwiched between conductive plates. The electric field between the conductive plates may be controlled by a polysilicon thin-film transistor.

16 Claims, 5 Drawing Sheets

FIELD-SEQUENTIAL DISPLAY SYSTEM UTILIZING A BACKLIT LCD PIXEL ARRAY AND METHOD FOR FORMING AN IMAGE

This invention was made with U.S. Government support under Contract No. F33615-88-C-1825 awarded by the Department of the Air Force. The U.S. Government has certain rights in this invention.

This application is a continuation of U.S. Ser. No. 07/455,195, filed Dec. 22, 1989, now abandoned.

BACKGROUND OF THE INVENTION

1. Field of the Invention

The present invention relates to liquid crystal display and more particularly to a backlit field sequential color display system.

2. Description of the Prior Art

The most widely used method of generating electrically-controlled color images uses a cathode ray tube (CRT) having a matrix of phosphor stripes or dots representing three primary colors and three electron guns which excite respectively differently ones of the color phosphors. Because the different colors are scanned simultaneously, and color separation depends upon position, this type of system is known as an "area multiplexed" video display system. Display systems of this type are advantageous because they are bright, relatively inexpensive and based on well-understood technology. However, CRTs are not suitable for use in every situation due to their relatively high power consumption, bulk, weight, and fragility.

Monochrome CRTs, that is CRTs having a uniform white phosphor coating, were used in an early type of color display system known as a "field sequential" display. This system was introduced by CBS Laboratories in the late 1940s for use in commercial television broadcast equipment. The CBS system sent distinct sequential red, green and blue image fields, in sequence, to the TV receiver. The receiver had a rotating color filter wheel in front of a single, white monochrome CRT screen. Synchronization of the three fields with the rotation of the filter wheel resulted in a color video display.

Recently, monochrome CRTs have been combined with nonmoving, switchable color filters covering the CRT screen to yield colored images by this same principle. Typically, three distinct white images are displayed on the CRT screen in sequence. The color transmitted by the switchable filter is synchronized with the sequence of images. This creates a repeating sequence of distinct colored images (for example, red, green, blue, red, green, blue, ... ). If the sequence rate (or "refresh rate") is high enough, the separate images combine in the eye of the viewer to make one colored image. The desirable frame rate which displays a flicker-free color image is approximately three times the frame rate for an area multiplexed system (e.g. 180 Hz, versus 60 Hz).

The switchable filters in these systems include: color selective linear polarizing filters in conjunction with twisted nematic liquid crystals (U.S. Pat. No. 4,758,818 to Vatne, Jul. 19, 1988; IBM Technical Disclosure Bulletin, Vol. 22, No. 5, October 1979, pp. 1769–1772, by Brinson and Edgar); liquid crystals which include pleochroic dyes (U.S. Pat. No. 3,703,329 of Castellano); and liquid crystals with birefringent materials (U.S. Pat. No. 4,097,128 of Matsumoto).

While avoiding the complexity and alignment problems of color matrix CRTs, these systems suffer from the drawbacks inherent in a monochrome CRT such as bulk, weight and power requirements. In addition, the color filters used in these systems, which may include as many as five or six panels, absorb a large proportion of the light emitted by the CRT, thus requiring a very bright CRT screen if brightness equivalent to an area-multiplexed display is to be maintained.

Because of these drawbacks, these CRT-based color display systems may be replaced by a new type of video display for certain applications. This new type of display is based upon a panel comprised of an array of light valves, each light valve corresponding to a single picture element, or pixel. When the array is illuminated from behind, typically by florescent or incandescent lamps, images can be formed by selectively opening and closing certain of the valves in the array. In displays of this type, the light source does not form the image directly; it should in fact be diffuse, so as to be evenly transmitted through the light valve array.

The most commonly used light valve now available is the liquid crystal (LC). Liquid crystal devices (LCDs) may be used to produce light-weight, compact, relatively high contrast display panels that use much less power than otherwise equivalent CRT display devices. These display panels are particularly useful as display devices in a portable computer or in an airplane cockpit where weight and power consumption are critical.

In a typical monochrome application, a matrix of LCDs, each occupying the area of one pixel, are constructed with integral thin film transistors (TFTs). The TFTs are individually addressed by circuitry external to the display device. When a TFT is addressed, it opens its associated LCD light valve allowing the backlight to pass through that pixel position in the array. When a pattern of LCD light valves is energized, an image is displayed on the LCD matrix. A display of the type described above is generally referred to as an LCD display. When the TFTs in an LCD display are controlled to only partially open their respective light valves, the image may include greyscale information. A system of this type is described in U.S. Pat. No. 4,742,346 to Gillette et al.

Monochrome LCD displays are widely used for computer displays and for video displays in small television sets. Recently, there has been a growing interest in color LCD displays. To be practical, a color LCD display should have brightness and longevity which approximates that of a color CRT and a refresh rate high enough to show smoothly moving images without flicker.

Currently, there are several types of color LCD display. One type of display uses LCDs in a consumer-market video projector. In this projector, the LCDs are not viewed directly, but act as does film in a movie projector. Steady-output colored light sources illuminate respectively different LCDs and the separate colored images produced by the LCDs are combined and projected onto a screen. In an exemplary LCD projector, the XV-100P projector manufactured by Sharp Corporation, there are three light sources (red, blue, and green) and three LCDs. Dichroic mirrors are used to separate white light into the three light sources and also to combine the separate images produced by the three LCDs into a single image. This image may be projected onto a screen using conventional optical lenses.

A hybrid display system using both CRTs and an LCD matrix uses three monochrome color CRTs (red, green, and blue) as light sources. Light from each CRT screen is picked up by a separate bundle of optical fibers fastened to the face of the CRT. The fibers of the bundles attached to the respective red, green, and blue CRTs are then alternatingly intermixed at their termination, which is fastened to the thin edge of a plastic light-diffusing plate. This plate is designed to provide uniform diffused illumination from its side when the edge is illuminated by the fiber bundle. The three CRTs are activated sequentially at an individual rate of 30 Hz; the combined rate is 90 Hz. An LCD panel covering the illuminating side of the plastic diffusing plate forms a field sequential image by spatially modulating the red, green, and blue images transmitted by the LCD. The generation of red, green and blue images on the LCD panel is synchronized with the light flashes from the respective CRTs.

This system is described in an article by H. Hasabe and S. Kobayashi entitled "A Full-Color Field-Sequential LCD Using Modulated Backlight," in the SID 85 Digest, pp.81–83. It uses a thin display panel, but requires three optical fiber bundles and uses three CRTs. Light is lost in passing from the CRT screen into the fiber array and through the diffusing panel, as well as in the LCD matrix. This display system is described as having a brightness of only 30 foot-lamberts (fL) as compared to 100 fL for a CRT display. Moreover, since this display system uses CRTs to produce the backlight, it suffers from the bulk, weight, and power consumption problems of conventional CRT displays.

Other prior-art designs for color LCD panels employ a white light source and an LCD panel tessellated with sub-pixel size color filter elements. Each individual filter element is aligned to cover, for example, one-third of one image pixel. Each pixel includes three separate TFTs and three respectively different primary color filter elements. Display systems of this type are referred to as area multiplexed color systems. The three primary color images are displayed simultaneously by energizing the respective sub-pixel image elements. An area multiplexed display of this type is described in an article by G. Stix, entitled "Manufacturing hurdles challenge large-LCD developers" in the IEEE Spectrum, September 1989, pp 36–40.

Area multiplexed LCD panels are less efficient than monochrome panels because of the color filter elements. Typical filter elements used in these displays pass only about twenty percent (20%) of the incident light.

Another consideration is that the distance between the pixels should be small enough so that the eye of the viewer does not perceive the image as excessively grainy. The individual sub-pixel elements of any particular color are not adjacent in area multiplexed systems; each pixel contains all three primary color sub-pixels and desirably has a cell dimension that does not exceed the grainy limit. This means that the sub-pixels must be smaller, by a factor of at least the square root of three, than the pixels. Thus, a portion of an image which is composed of a single color is dimmer by at least a factor of the square root of three than a white portion of the image.

In addition, each of these sub-pixels has a separate energizing TFT with associated addressing lines. These elements tend to decrease the fill factor of the display (the fill factor is defined as the proportion of panel area which transmits light). This reduced fill factor further reduces the brightness of an area-multiplexed LCD display as compared to a monochrome LCD array.

Since the filter mosaic is integral with the LCD panel, the individual filter elements are desirably aligned very closely with their associated sub-pixels. The presence of these filter elements restricts the high-temperature processing steps which may be performed on the LCD array. Furthermore, the chemical dyes which are used to form the filter elements are subject to degradation over time.

A further disadvantage of area multiplexed screens is the appearance of "artifacts" in the image due to the smaller size of the sub-pixels as compared to monochrome pixels. One type of artifact is caused by "charge-sharing" between adjacent pixels. The liquid crystal material in an LCD is energized by placing an electric field across the material in the pixel area. Since the sub-pixel elements are relatively small, charge from one sub-pixel may affect the liquid crystal material beneath an adjacent sub-pixel. This may affect the purity of the displayed color.

SUMMARY OF THE INVENTION

A field-sequential display device for producing color images employs a panel comprising a matrix of small light valves, the light transmissive properties of which can be selectively controlled. The display device includes a plurality of colored light sources which are strobed to illuminate the panel from behind. Single-color images representing separate components of a composite image are formed by scanning a sequence of lines. The display device includes a scanner which scans each of the colored light sources in synchronism with the scanning of the lines of the image. The invention also includes a method of displaying an image comprising the steps of selectively controlling the light transmissive properties of a matrix of light valves in a display panel means wherein single-color images representing separate components of the color image are formed by sequentially activating successive lines of light valves in the matrix of light valves; alternatively strobing a plurality of colored light sources to provide light for transmission through the matrix of light valves; and activating each of the colored light sources in spatial correspondence with the scanning of the lines of the light valve matrix.

BRIEF DESCRIPTION OF THE DRAWING

FIG. 2b is a front plan view of the field sequential LCD display device shown in FIG. 2a.

DETAILED DESCRIPTION

Figure 1:
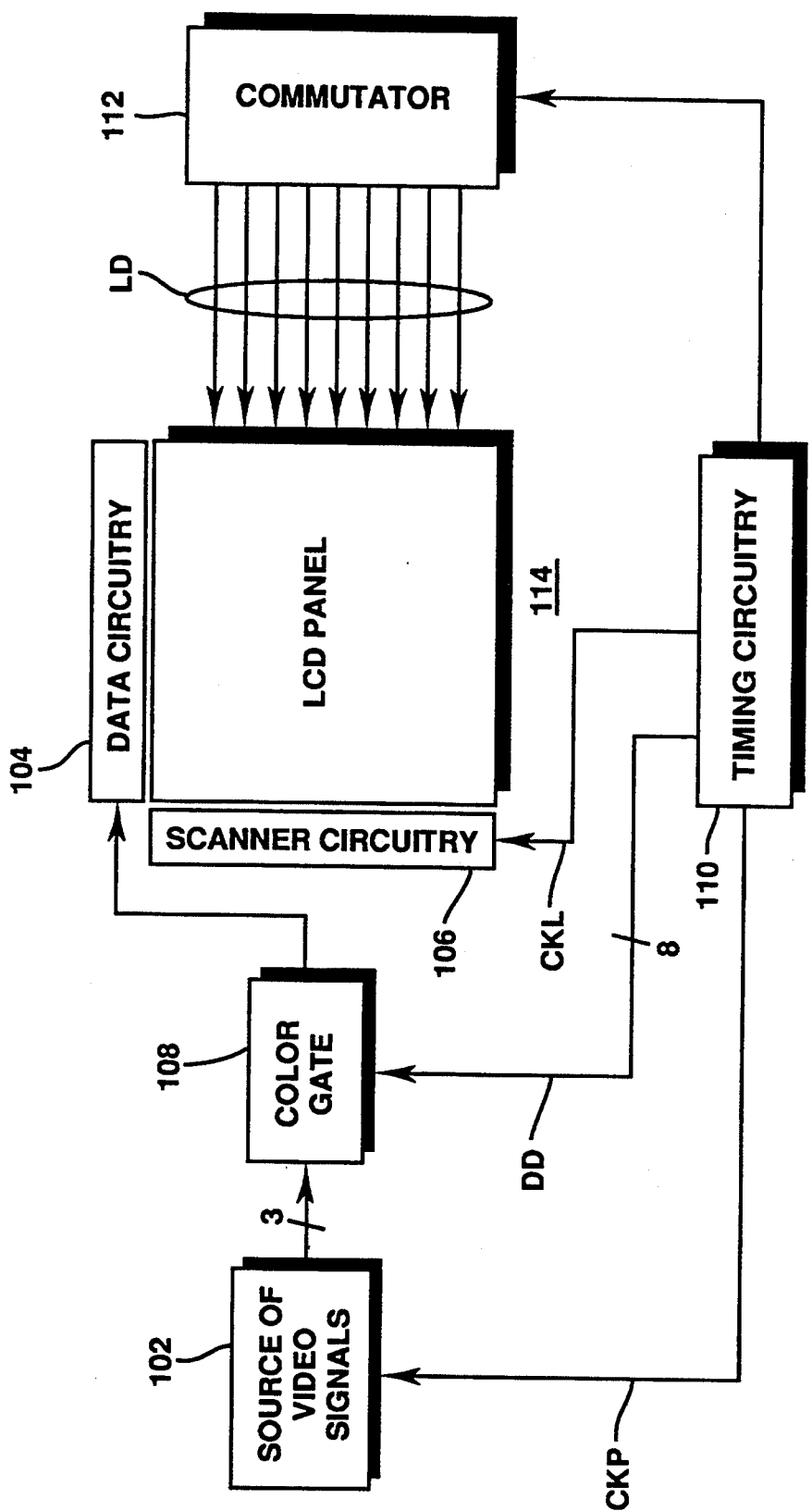
FIG. 1 is a block diagram of a field sequential color display system which includes an embodiment of the invention.

In the exemplary embodiment of the invention, as shown in FIG. 1, an active LCD display panel 114 is successively driven with red, green and blue video information obtained from a source of video signals 102. Color is obtained by flashing red, green, or blue fluorescent backlights at the end of liquid crystal settling time for each field. The fluorescent lamp tubes are arranged in staggered banks of red, green and blue. In operation, the red lamps are flashed in sequence responsive to commutation circuitry 112 as the red video information is scanned onto the LCD display panel, the the green lamps are flashed in sequence as the green information is displayed and then the blue lamps are flashed in sequence as the blue information is displayed.

In FIG. 1, a digital sampled data video signal is provided by the source 102 responsive to a clock signal PCLK provided by timing circuitry 110. The source 102 used in this embodiment of the invention may include a digital memory having a number of storage locations sufficient to hold a frame of video information. Each stored video sample consists of a three-bit value which defines the color of the displayed pixel. In this exemplary embodiment of the invention, the sample values zero to seven correspond to the colors black, blue, yellow, red, cyan, green, magenta and white. It is contemplated that each sample may also include a multi-bit luminance part for use with an LCD display device that can display gray scale.

In operation, the source 102 is scanned at a rate sufficient to provide information to the LCD array 114 at a frame rate of 180 Hz. In this configuration, each frame is repeated three times.

The frames are provided as lines of sample values by the source 102 to color gate circuitry 108. A pixel drive value is selectively provided by the gate circuitry 108 to the data circuitry 104, based on the values of the samples. For example, if a sample has a value of one, indicating that it is yellow, the color gate circuitry 108 provides a signal substantially at ground potential for the sample during the red and green frame intervals and a signal at a positive potential, V+ during the blue frame interval. Consequently, the corresponding LCD transmits light during the red and green frame intervals and blocks the light during the blue frame interval to display a yellow pixel. The color gate circuitry is described below with reference to FIG. 5b and the data circuitry 104 is described below with reference to FIG. 2b.

When a line of pixel samples is loaded into the data circuitry 104, a single row of TFTs in the LCD array 114 is activated to transfer the sample values stored in the data circuitry onto capacitors which control the transmissivity of the pixel cells in a line of the image. The row of TFTs is activated by LCD scanner circuitry 106 which is controlled by the timing circuitry 110. This circuitry is described below in reference to FIG. 2b.

The timing circuitry 110 also controls the sequencing of the lamps 200 through 218 (shown in FIGS. 2a and 5a) behind the LCD array. In the exemplary embodiment of the invention, these lamps are activated in a sequence which is synchronized to the activation of rows of pixels in the LCD array 114. There are two reasons for scanning the lamps 200 through 218 in synchronism with the scanning of the display. First, for the pixel cells that are activated near the end of a frame interval, a sharper image is obtained when the excitation of the lamp is delayed to match the activation of the line of pixel cells. This allows the pixel cells adequate time to stabilize before they block or transmit light. Second, the commutation of the lamps reduces the radio frequency interference (RFI) produced by the device since smaller and more frequent pulses are produced to drive the commutated lamps than would be produced if all of the lamps of a single color were flashed simultaneously.

The use of a scanned display also provides a greater setup time for the individual pixel cells. Since only a relatively small number of pixel cells need to be active at any given time. During the time interval that some of the pixel cells are active, the remaining pixel cells in the display 114 may be in transition without affecting the perceived quality of the image. The timing and lamp driving circuitry 110 and the commutating circuitry 112 are described below in reference to FIGS. 5a and 6.

Figure 2B:
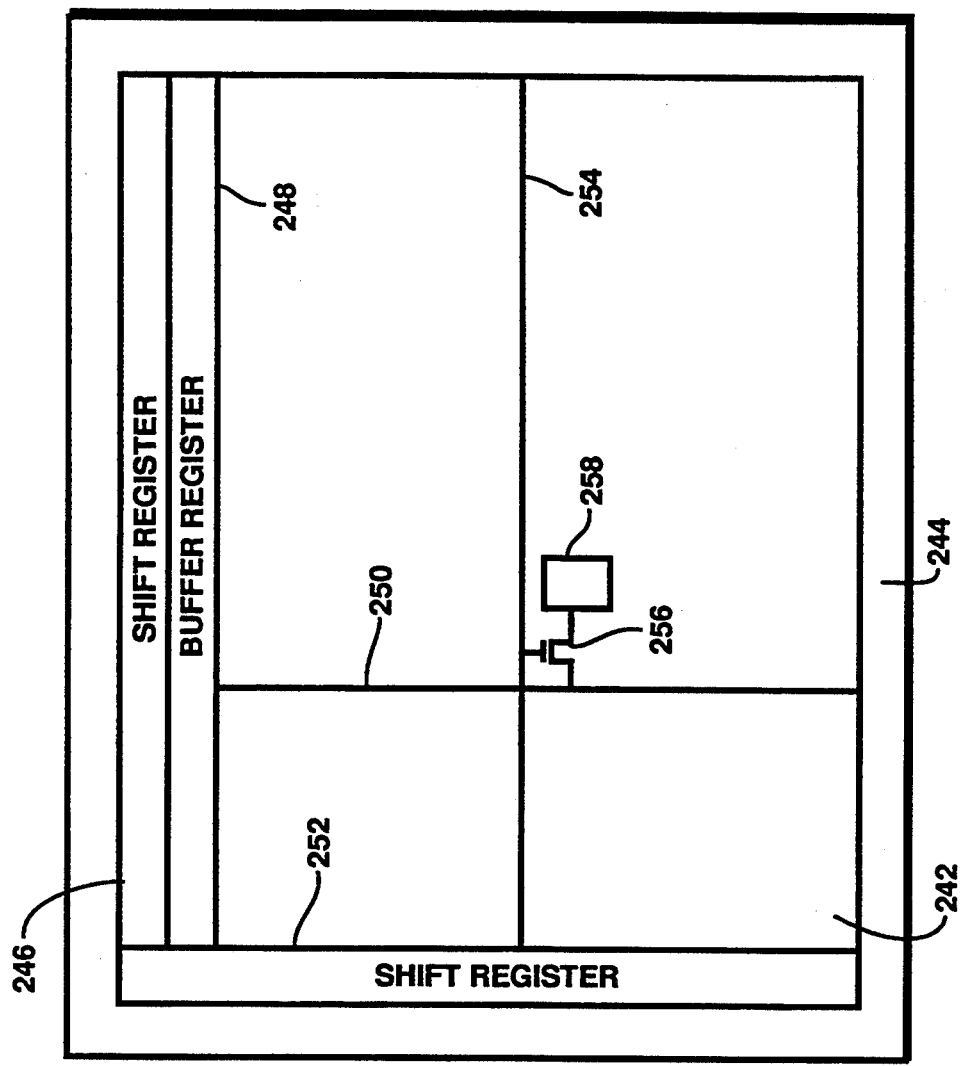
Figure 2A:
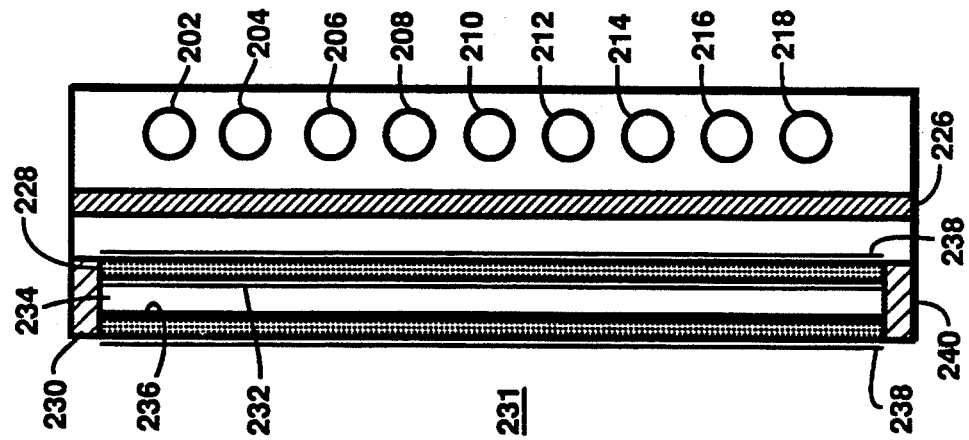
FIG. 2a is a cross sectional view of a field sequential LCD display device suitable for use in the color display system shown in FIG. 1.

FIG. 2a is a cross-sectional diagram of the LCD display panel 114, shown in FIG. 1. This cross-section is not to scale; it is expanded horizontally to aid in describing the structure of the panel 114. The lamps 202 through 218 are arranged at the back of the display panel. These lamps are interleaved such that the lamps 202, 208, and 214 are red lamps, the lamps 204, 210 and 216 are green lamps and the lamps 206, 212 and 218 are blue lamps.

The angle of the light incident on the display from lamps 202 through 218 is randomized by a diffusion plate 226. The light provided by the diffusion plate is either passed or blocked by the individual pixel elements in an LCD array 231. The array 231 includes liquid crystal material 234 sandwiched between two glass plates 228 and 230.

In the exemplary display system, the display light valves and individual backlight elements are both designed to switch in a period which is small compared to each of the individual color field periods. The optimal thickness depends upon the liquid crystal material, e.g. twisted nematic, ferroelectric, guest-host, and the mode of operation, e.g. twisted, birefringent or pi cell. The liquid crystal material 234 used in this embodiment of the invention is ZLI 2293 of E Merck and Company, a standard twisted nematic material, selected for its relative speed, chemical inertness and stability. The plates 228 and 230 are separated by between about one and four micrometers ($\mu$m) and are hermetically sealed by an epoxy seal 234 which extends around the perimiter of the two plates. The epoxy sealant used in the exemplary embodiment of the invention has a cure temperature of approximately 150 degrees Celsius. This high temperature is advantageous in driving moisture from the space between the plates 6 and 7 during fabrication. In this embodiment of the invention, higher temperatures may be used to cure the epoxy than may be used with an area multiplexed display because the present display does not include color dyes which may be adversely affected by the high temperature processing. After the epoxy sealant has been cured, the liquid crystal material 234 is inserted through a hole (not shown) in the seal. The hole is then sealed using, for example, an indium plug and a relatively low-temperature epoxy.

Polarizing coatings 238 are placed on the sides of the glass plates away from the liquid crystal. These coatings are oriented to pass light which is polarized in crossed directions, e.g., one coating passes horizontally polarized light and the other passes vertically polarized light. The twisted nematic LCD material twists the polarization of the light by 90× in the absence of an electric field. Thus, when not activated, an LCD cell transmits light and when activated it blocks light.

The side of the glass plate 228 which is closest to the liquid crystal material 234 is covered with a transparant conductive coating such as tin oxide or indium oxide. This coating is coupled to a source of reference potential (e.g. ground) and forms one plate of the capacitance which controls the transmissive properties of the liquid crystal material.

The side of the plate 230 which is closest to the liquid crystal material is covered with a matrix 236 that forms the active electrical portion of the LCD display. The matrix 236 includes an array of transparent conductive plates, such as the plate 258, one for each pixel position in the display. Each of these conductive plates 258 is each coupled to a vertical data line (e.g. 250) and a horizontal scan line (e.g. 254) by a thin-film transistor (e.g., 256). The conductive plates 258 are formed from tin oxide or indium oxide coating and the TFTs 256 are formed from polysilicon which is vapor-deposited onto the glass plate 230. The data and scan lines, 250 and 254 respectively, are formed by aluminum deposited over an oxide grown on the polysilicon. For the sake of simplicity, only one conductive plate 258, one TFT 256, one scan line 254, and one data line 250 are schematically illustrated in FIG. 2b. In an actual display device, however, there would be one conductive plate and one TFT for each pixel position, one scan line for each row of pixel positions and one data line for each column of pixel positions.

When the TFT 256 is activated by a pulse on the scan line 254, it changes the charge on the conductive plate 258 to match the potential on the data line 250. If this potential is ground, the LCD cell will transmit light. If the potential is positive, the LCD cell will block the light.

The data circuitry 104 may include a shift register 246 which is loaded one bit-position at a time by the signal provided by the color gate circuitry 108 of FIG. 1. When an entire line of pixel values has been loaded into the shift register 246, it is transferred in parallel into a buffer register 248. The contents of the buffer register 248 are applied to pixel data lines 250 which are arranged vertically on the face of the LCD panel with a spacing of one pixel width. During the time interval in which the next line of pixel values is being loaded into the shift register 246, one of the scan lines 254 is pulsed to transfer the pixel values in the buffer register 248, via the data lines 250, onto the respective conductive plates 258 which cover one the line of pixel positions.

In this embodiment of the invention, the scan lines 254 are coupled to a shift register 252 which is controlled by a clock signal, LCK, provided by the timing circuitry 110. This shift register is configured to transfer a predetermined logic value from stage to stage, where each stage corresponds to a line in the image. During the time that the logic value resides in a particular stage, an activating signal is applied to the gate electrodes of the TFTs 256 coupled to the conductive plates 258 on the corresponding line of the display device. This signal allows the TFTs to charge the plates to the potentials of the respective pixel elements as stored in the buffer register 248.

To obtain high contrast in the LCD array, the pixel TFTs should provide a relatively high drive current to quickly turn on the pixel. The desired drive current for the disclosed field sequential display device may be greater than that for an area multiplexed display device since the area of each pixel in the field sequential device is greater than in the area multiplexed device and since it is desirable to change the pixels in the field sequential system at a faster rate (e.g., 180 Hz) than in the area multiplexed system (e.g., 60 Hz).

Pixel transistors having the desired switching speed and current capabilities may be fabricated using conventional thin-film techniques on vapor-deposited polysilicon. In the exemplary embodiment of the invention, 10 $\mu$m design rules are used. All of the TFTs in the exemplary pixel array are N-channel enhancement mode MOS devices.

The TFT array is fabricated on glass substrates at temperatures below 600 degrees Celsius. In the prior art, quartz has been used as a substrate for high-temperature processes, but quartz is relatively expensive compared to glass. Inexpensive, low-temperature glass substrates do not allow the use of thermally-grown gate oxides.

In the present embodiment of the invention, the glass plates 228 and 230 may be fabricated using either Corning Glass #7059 or Hoya Glass #NA-40. Since this plate serves as a substrate for the deposition of the pixel matrix, it must be annealed to compact the glass so that it is dimensionally stable during the thermal cycling of the deposition process. The temperatures involved in the processing steps are in the range 400 to 600 degrees Celsius.

Figure 3:
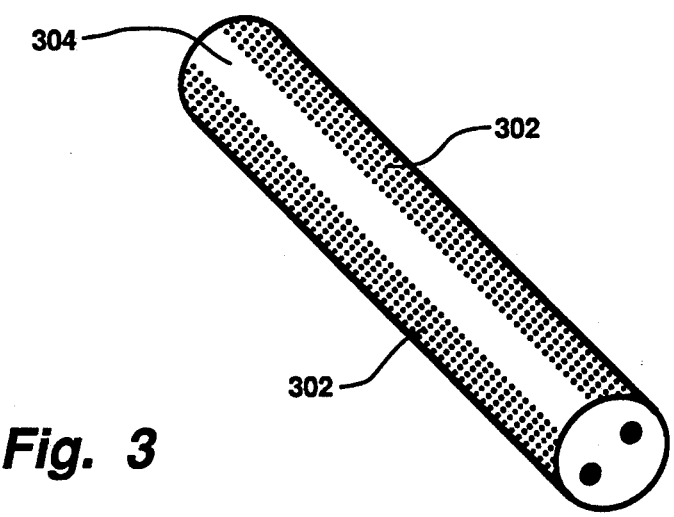
FIG. 3 is a perspective view of a fluorescent lamp tube suitable for use in the LCD display device shown in FIGS. 2a and 2b.

FIG. 3 is a perspective view of one of the lamps 202-218 used in the exemplary embodiment to provide the back lighting for the LCD display. These lamps are mercury vapor lamps that are internally covered with one of three single-phosphor coatings designed respectively to emit three primary colors; in the exemplary embodiment these are red, green, and blue with C.I.E. coordinates (x,y) respectively (0.57,0.35), (0.29,0.57), and (0.12,0.08). The corresponding saturated-color spectral wavelengths are respectively 605 nanometers (nm), 548 nm, and 472 nm.

Each of the lamp tubes is approximately seven millimeters (mm) in diameter For uniform illumination they are preferably closely packed (e.g., at 8 mm centers) and are long enough to extend two to four centimeters (cm) past either end of the display section of the panel. To facilitate the description of the described embodiment of the invention, only nine lamps, 202-218, are shown. In the prefered embodiment of the invention, 24 lamps are used to illuminate an 8 by 12 inch display. The illustrated design may be readily extended by one ordinarily skilled in the art to operate with 24 lamps.

Having a large number of lamps enables one to operate the system in a continuous scrolling mode where the number of activated lamps remains approximately constant and progressively scans the light valve array in synchronism with the scrolling electrical activation of the light valve array. This will usually include simultaneous illumination of different parts of the array by different color lamps. When operating in the scrolling mode, this display is divided into at least three regions, i.e. a first region well ahead of the scan which contains prior color field data (for example red); a second region behind the scan which contains new color field data (for example green); and a third transition region near the scan boundary where the pixels are in transition from red to green. In this example of the scrolling mode, the backlight is designed so that all red lamps which can illuminate the red first region are on; all green lamps which can illuminate the green second region are on; and that all lamps which can illuminate the transition region are off.

To increase the brightness of the display, the insides of the glass lamp tubes are coated with phosphor 302 only three-quarters of the way around (subtending approximately 270 degrees); a longitudinal stripe 304 subtending the remaining 90 degrees is left clear glass to emit more light in that direction. The 90-degree stripe is aligned toward the diffusion plate 226, shown in FIG. 2, to maximize panel brightness. In this instance, it may be desirable to place filters over the red and green lamps to block the blue light that is produced by the ionized mercury vapor and is passed through the clear glass stripe 304. The tubes may also be entirely coated with phosphor and silvered beneath the phosphor three-quarters of the way around the inside circumference of the bulb. The lamps 202 through 218 should be bright enough provide a total illumination of approximately 2000 fL at maximum illumination.

As set forth above, the field-sequential color system operates at a 180-Hz field refresh rate, three times faster than conventional area multiplexed LCDs. To meet this field rate, each lamp should be able to turn on for a period of approximately 5 millisecond (ms) with a repetition rate of 60 Hz. The lamps 202–218 used in this embodiment of the invention are of the hot cathode type for quick response: light emission rises with current substantially instantaneously, and decays within 500 microseconds ($\mu$s) of the current cessation (end of UV excitation). Light flashes can be as short as 1 ms and can repeat at 60 Hz.

Changes in the duty cycle of the lamps can be used to momentarily highlight or dim the display. As long as the cathode is hot, the starting pulse can be arbitrarily small in duration, so the screen can be dimmed substantially without limit.

An advantage of the invention over area multiplexed systems is the ability to change the color balance of the display by changing the relative duty cycles of the red, green and blue banks of lamps, or even by replacing the backlight tubes with tubes of another color. Also, correction for intensity and color nonuniformities can be made by individually adjusting the flash duration of each lamp. This may be useful to compensate for individual failed or weak lamps.

For long lamp life, the peaking factor (ratio of maximum instantaneous lamp current to steady-operation lamp current) of between 3 and 5 is desirable for the lamps 202–218. This peaking factor is desirable since the lamps are driven with current pulses at a relatively high rate.

Figure 4:
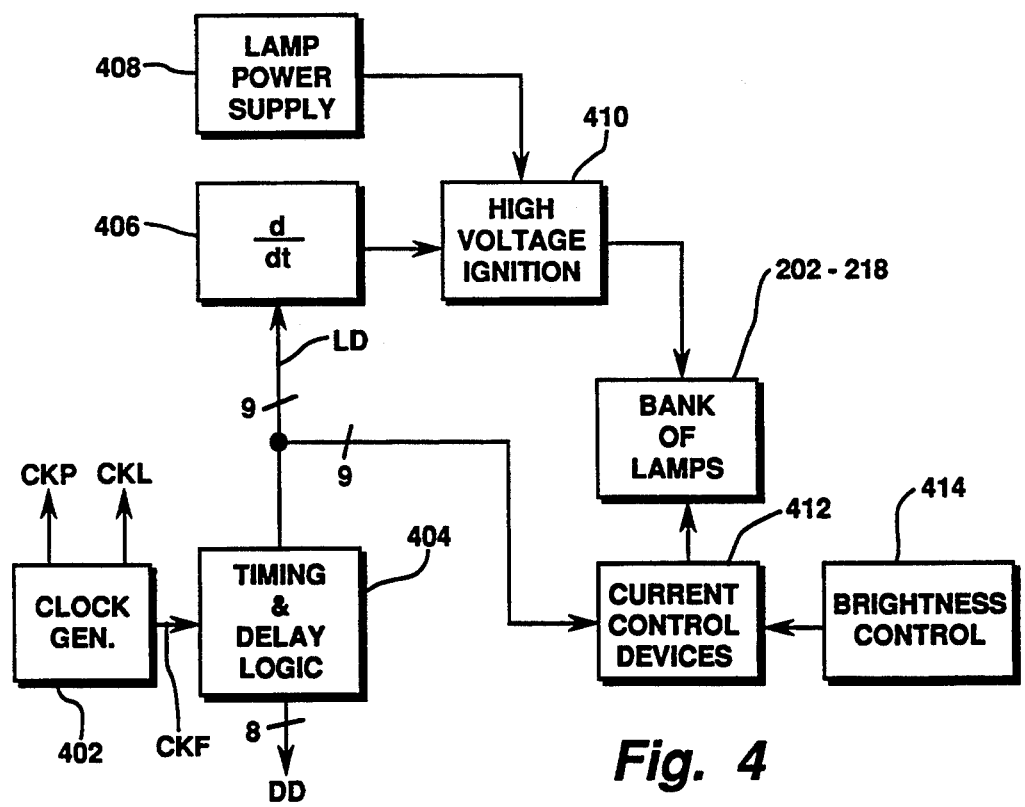
FIG. 4 is a block diagram of timing and lamp driving circuitry suitable for use with the field sequential color display system shown in FIG. 1.

FIG. 4 is a block diagram of the timing and lamp driving circuitry 110, shown in FIG. 1, which drives the lamps 202–218, the LCD pixel array 231 and the source of video signal 102. The clock signals CKP, CKL and CKF which define the respective pixel, line and frame rates used in the display system are produced by a clock generator 402. The generator 402 may include, for example, a resonant crystal controlled oscillator (not shown) having a free running frequency at the desired pixel rate and pulse shaping circuitry (not shown) to produce the signal CKP. In addition, the clock generator 402 may include frequency dividing circuitry (not shown) which divides the signal CKP in frequency to produce the line rate clock signal, CKL, and the frame rate clock signal, CKF. Circuitry suitable for use as the timing circuitry 110 may be readily constructed by one ordinarily skilled in the art of digital signal processing circuit design.

The signal CKP is provided by the circuitry 110 to the source of video signal 102 as shown in FIG. 1 to condition the source 102 to provide pixel samples to the data circuitry 104 of the LCD display device 114. This signal defines the rate at which sample values are shifted into the shift register 246, shown in FIG. 2, of the data circuitry 104. Although the exemplary embodiment of the invention shows sample values being provided one at a time by the source 102, it is contemplated that multiple pixel samples may be simultaneously provided to the shift register 246. In this instance, the frequency of the clock signal CKP would be reduced in direct proportion to the number of samples provided.

The frame rate clock signal, CKF, is provided by the clock generator 402 to timing and delay logic circuitry 404. The circuitry 404 generates a set of eight signals, DD, which define the display drive intervals for the eight colors, black, blue, yellow, red, cyan, green, magenta and white.

The logic circuitry 404 also generates a set of nine signals, LD, which define the drive intervals for the nine lamps 202–218. The nine signals LD are each differentiated and logically ORed by a differential circuit 406. The differential circuit 406 may include, for example, nine capacitors (not shown) configured in series with the nine lamp drive signals LD; nine pulse forming circuits (not shown) to convert the pulses provided by the capacitors into logic levels, and a nine-input OR gate (not shown).

The output signal provided by the circuit 406 is applied to high voltage ignition circuitry 410 which is coupled to the lamp power supply 408. In response to a positive-going transition on any of the signals LD, the differential circuit 406 conditions the high voltage ignition circuit to apply a relatively high voltage pulse to one end of each of the lamps 202–218 whenever any one of the lamps is to be ignited. The ignition circuitry 410 may include, for example a power MOSFET (not shown) which is coupled to selectively apply power to a conventional auto-transformer (not shown).

The lamp drive signals LD provided by the logic circuitry 404 are also applied to respective current control devices 412 which are coupled to the respective lamps 202–218 at the ends opposite to the connection with the high voltage ignition circuitry 410. Each current control device 412, which may include a power MOSFET transistor (not shown), is controlled by its associated signal LD to provide a connection between its associated lamp and a source of reference potential (e.g. ground) only when the lamp is to be ignited.

In this embodiment of the invention, a brightness control circuit is provided between the current control devices and ground. This circuit regulates the amount of current provided to the lamps when they are activated to control the brightness of the display.

The circuitry used for the differentiator 406, the lamp power supply 408, the high voltage ignition circuit 410, the current control devices 412 and the brightness control 414 are conventional in design and may be readily constructed by one of ordinary skill in the art.

Figures 5A, 5B:
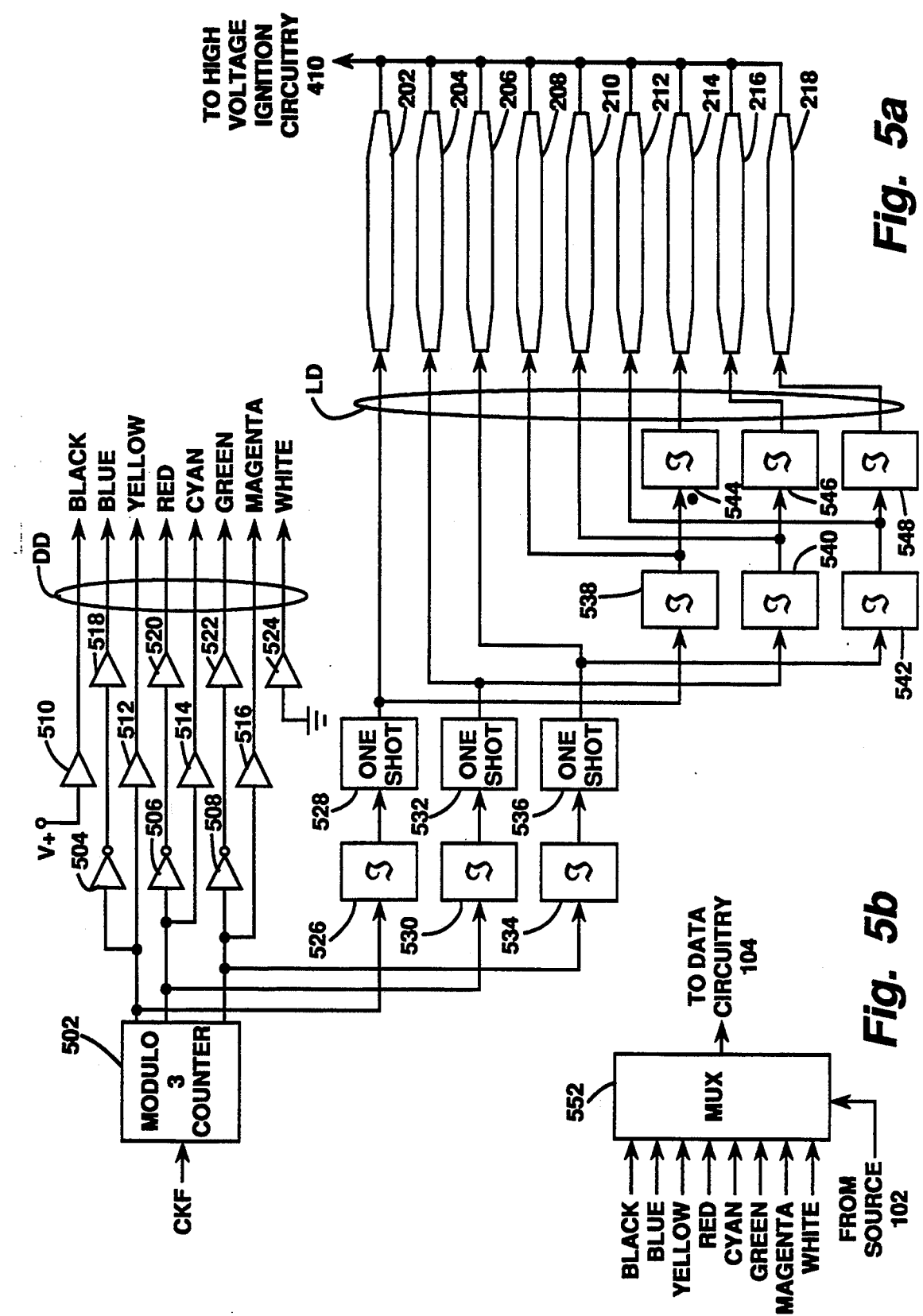
FIG. 5a is a block diagram of a timing and delay circuitry suitable for use with the field sequential color display system shown in FIG. 1.
FIG. 5b is a block diagram of color gating circuitry suitable for use with the color display system shown in FIG. 1.

FIG. 5a is a block diagram of circuitry suitable for use as the timing and delay logic 404 of FIG. 4. In this circuitry the frame rate clock signal, CKF, is applied to a modulo 3 counter 502. The counter 502 provides three signals which are inverted versions of the red, green and blue pixel display drive signals, respectively. These three signals are applied to buffer gates 514, 516 and 512, respectively to provide the drive signals for the respective cyan, magenta and yellow color signals. The signals produced by the counter 502 are also provided to respective inverters 506, 508 and 504, the output terminals of which are coupled to buffer gates 520, 522 and 518, respectively. The gates 520, 522 and 518 provide the drive signals for the respective colors red, green and blue. The drive signal for the color black is provided by a buffer gate 510 the input terminal of which is tied to a source of positive potential, V+, and the drive signal for the color white is provided by a buffer gate 524 the input terminal of which is tied to ground.

The yellow (i.e. not blue) display drive signal provided by the counter 502 is applied to a delay element 526 and the delayed signal provided thereby is applied to a monostable multivibrator (one-shot) 528. The output signal of the one-shot 528 is a pulse signal which is timed and shaped appropriately to serve as the lamp drive signal, LD, for the red lamp 202. This signal is applied to the current control device 412 (shown in FIG. 4) which is coupled to the lamp 202. In response to this signal, the lamp 202 is conditioned to conduct an electric current provided by the high voltage ignition circuitry 410, as set forth above and so, to emit light.

The cyan and magenta display drive signals are coupled in the same way to the respective delay element, one-shot pairs 530, 532 and 534, 536 to provide the lamp drive signals LD for the respective green and blue lamps 204 and 206. The LD signals for the lamps 202, 204 and 206 are delayed by respective delay elements 538, 540 and 542 to generate LD signals for the respective red, green and blue lamps 208, 210 and 212. The LD signals for these lamps are further delayed by the respective delay elements 544, 546 and 548 to produce the LD signals for the respective red lamp 214, green lamp 216 and blue lamp 218.

FIG. 5b illustrates a color gate circuit 108 (shown in FIG. 1) suitable for use with the exemplary embodiment of the invention. In FIG. 5b, the display drive signals black, blue, yellow, red, cyan, green magenta and white are applied to respectively different data input terminals of an eight-way multiplexer 552. The control input port of the multiplexer is coupled to receive the three-bit video signal provided by the source 102. In response to this control signal, the multiplexer 552 passes one of the display drive signals to the data circuitry 104 of the display panel 114, shown in FIG. 1. A value at ground potential or at the positive potential V+ is passed depending on whether the corresponding pixel is to respectively transmit or block light emitted by the lamps 202-218.

Figure 6:
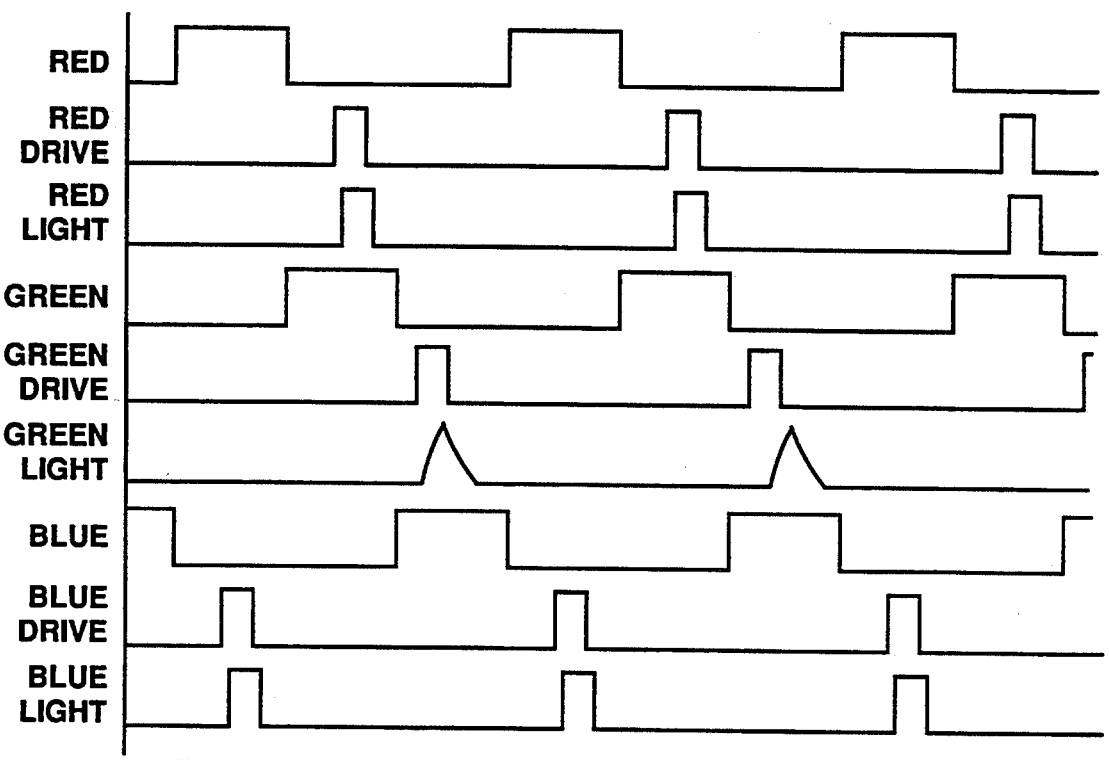
FIGS. 6 and 7 are timing diagrams showing signal amplitude as a function of time for several signals used by the color display system shown in FIG. 1.

FIG. 6 is a timing diagram which illustrates the relative timing of the display drive signals, red, green and blue and the lamp drive signals red-drive, green-drive and blue-drive. As shown in the timing diagrams, each of the display drive signals occurs at a time significantly before its corresponding lamp drive signal. The delay between the display drive and lamp drive signals allows for signal propagation through the data circuitry 104, data lines 250 and TFTs 256 of the LCD panel 114 and allows for the time to charge the capacitor plate 258 and to reorient the liquid crystal material 234 beneath the plate 258. All of these events desirably occur before the lamp is flashed in response to the corresponding lamp drive pulse.

Figure 7:
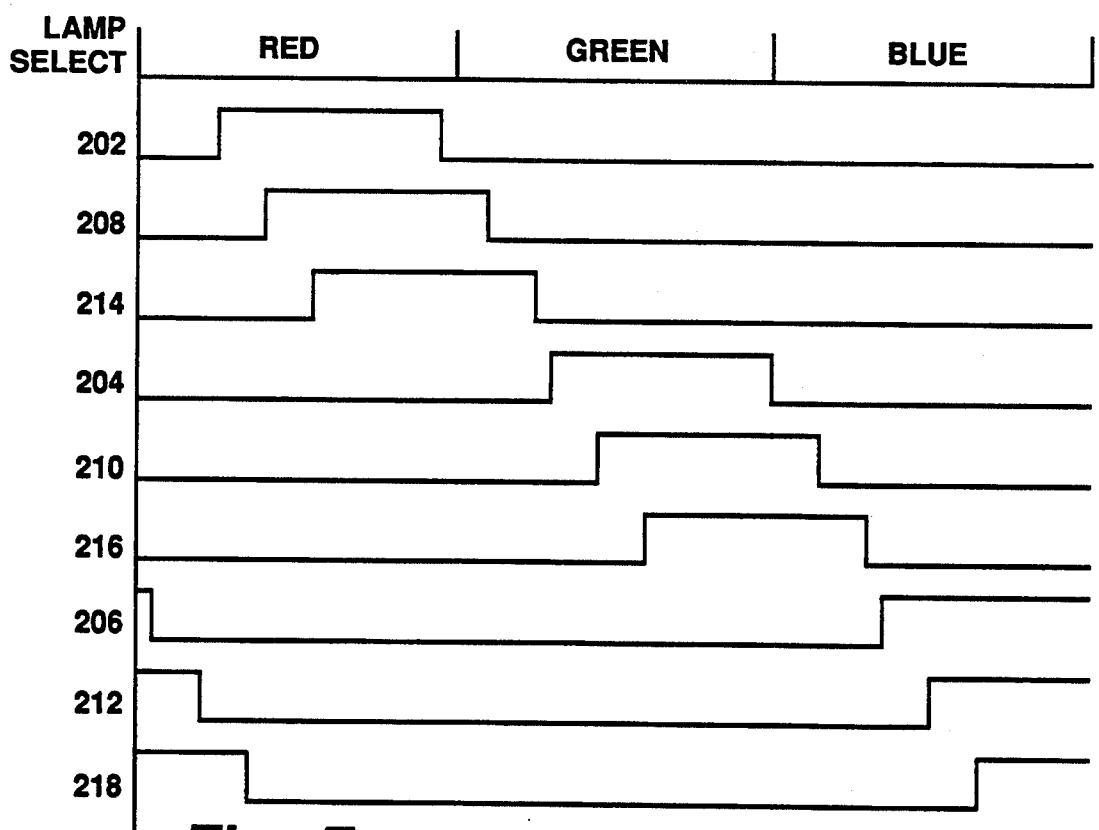

FIG. 7 is a timing diagram which illustrates the relative timing of the lamp drive signals, LD, for the lamps 202-218. As illustrated by this diagram, the lamps that are closer to the bottom of the display panel 114 are activated later than the lamps closer to the top. The sequencing of lamps of each color is timed to follow the scanning of lines on the LCD display 231. As set forth above, the ignition of the lamps is delayed to ensure that the pixels near the bottom of the screen are properly set up before they are expected to transmit or block light.

The field-sequential color display system of the described embodiment of the invention can provide a display which is up to 500% brighter than a conventional area-multiplexed color display having individual color filters at each sub-pixel element. The color filters used in conventional area multiplexed systems absorb roughly eighty percent (80%) of the light in transmission. This loss factor is multiplied by an additional loss factor resulting from the lesser fill factor of area multiplexed LCDs (0.55) versus field sequential LCDs (0.77), a difference of about 1.4 times. As used in this description, the term "fill factor" is defined as the ratio of active pixel area to the area of the display panel.

Elimination of color filters also reduces registration problems between the filter mosaic and the LCD array, allows high temperature processing and avoids contamination of the liquid crystal material by the dye chemicals. Moreover, the greater light-transmission efficiency of the present invention, with the use of fluorescent lamps, results in three to six times less power and heat dissipation in the display of the invention as compared to a typical area multiplexed displays.

A full-color area multiplexed LCD has three times the number of pixels of a field sequential LCD. Since the difficulty of manufacturing increases with the number of elements, this greater number of pixel elements is a disadvantage. Because the field sequential TFT plate is made with larger design rules and incorporates only one third the number of active devices, such a system can be fabricated with substantially higher yield than an area-multiplexed system.

To display saturated color with a 180 Hz refresh rate the liquid crystal should desirably respond to changes in the electric field across the pixel capacitors in a time that is short compared to 5 ms. This response time is much less than for an area multiplexed system. However when displaying black and white information, the time constraints on the liquid crystal are no more severe than for the area multiplexed display. In that special case, the liquid crystal orientation at each pixel is the same in each of the three color fields, so the response time required of the LC is no more severe than that for area multiplexed color. From this, it follows that the failure of the field sequential color system with a slowly responding LC is characterized by color desaturation.

When desired, the display intensity may be increased with only moderate loss in color saturation from the 250 fL of normal operation to 500 fL by increasing the lamp duty cycle from 12% to 25%. If a very bright display is needed to flash or highlight important information, the display may be pulsed to 2000 fL by first loading the array and then flashing all lamps at once.

It is clear that the invention also comprises a method for generating a color image, comprising the steps of selectively controlling the light transmissive properties of a matrix of light valves in a display panel means wherein, single-color images representing separate components of the color image are formed by sequentially activating successive lines of light valves in the matrix of light valves; alternatively strobing a plurality of colored light sources to provide light for transmission through the matrix of light valves; and activating each of the colored light sources in spatial correspondence with the scanning of the lines of the light valve matrix. In the method of the invention each of the light valves in the matrix of light valves is a liquid crystal device, the light transmissive properties of which are externally controlled; each of the plurality of colored light sources includes a plurality of individual colored light sources which may be independently activated; and the individual colored light sources of each one of said plurality of colored light sources are spatially interleaved with the individual colored light sources of the other ones of said plurality of colored light sources. The plurality of colored light sources are configured to be alternately strobed in synchronism with the formation of single-color images on said matrix of light valves. Each of the plurality of colored light sources includes a plurality of separately operable single-color light sources and the separately operable single-color light sources of the plurality of light sources are interleaved to provide illumination for the matrix of light valves.

It is also clear that alternate nonfluorescent light sources may also be used in the display of the invention. Such alternatives may include a cathodoluminescent backlight or an electroluminescent panel. In addition, although the invention has been described in terms of an active matrix display, alternative addressing schemes such as direct multiplex can be used.

The invention claimed is:

1. Apparatus for generating a color image, comprising;
    display panel means, including a matrix of light valves the light transmissive properties of which can be selectively controlled wherein, single-color images representing separate components of the color image are formed by sequentially activating successive lines of light valves in the matrix of light valves;
    a plurality of single color light sources which are alternately strobed to directly emit light for transmission through the matrix of light valves, wherein each of said single color light sources may be selectively activated to emit light in at least first and second distinct spatial locations corresponding to respectively different lines of said light valves; and
    means for activating, in synchronism, each of the single color light sources in spatial correspondence with the scanning of the lines of the light valve matrix to sequentially illuminate said first and second spatial locations with each one of said single color light sources at respectively different instants;
    wherein;
    each of the light valves in said matrix of light valves is a liquid crystal device, the light transmissive properties of which are externally controlled;
    each of said plurality of single color light sources includes a plurality of individual single color light sources which my be independently activated; and
    the individual single color light sources of each one of said plurality of single color light sources are spatially interleaved with the individual single color light sources of the other ones of said plurality of single color light sources.

2. The apparatus of claim 1 wherein each of said individual single color light sources includes a fluorescent lamp which has a hollow translucent form having a long dimension and a short dimension, said form being coated with a fluorescent material which emits light of said color.

3. The apparatus of claim 2 wherein each of said fluorescent lamps is coated with a fluorescent material except for a stripe parallel to the long dimension which is not coated.

4. The apparatus of claim 1 wherein,
    the color image is updated at a frame rate of not less than 50 Hz; and
    each of said liquid crystal devices includes a twisted nematic liquid crystal material sandwiched between first and second control electrodes which are separated by a distance of less than four micrometers.

5. The apparatus of claim 1 wherein the light transmissive properties of each of the light valves is controlled by an associated thin-film transistor.

6. Apparatus for generating a color image, comprising:
    display panel means, including a matrix of light valves the light transmissive properties of which can be individually controlled, wherein, single-color images representing separate components of the color image are formed by activating the light valves in the matrix of light valves in a predetermined sequence; and
    a plurality of single color light sources each including a plurality of separately operable light sources which directly emit light of a single color wherein the separately operable light sources of said plurality of single color light sources are interleaved; and
    means for sequentially and selectively strobing each of said plurality of separately operable light sources of each of said plurality of single color light sources in synchronism with the formation of each respective single-color image on said matrix of light valves to provide light for transmission through the matrix of light valves.

7. The apparatus of claim 6 wherein:
    the light valves in said matrix of light valves are arranged in rows and columns and said single color images are formed by activating successive rows of light valves in said matrix; and
    said apparatus further comprises means for sequentially activating successive ones of said separately operable light sources of each of said plurality of single color light sources in synchronism with the activation of successive rows of light valves in said matrix.

8. The apparatus of claim 7 wherein each of said separately operable light sources of each of the single color light sources includes a fluorescent lamp which has a hollow translucent form having a long dimension and a short dimension, said form being coated with a fluorescent material which emits light of said single color.

9. The apparatus of claim 8 wherein each of said fluorescent lamps is coated with a fluorescent material except for a stripe parallel to the long dimension which is not coated.

10. The apparatus of claim 6 wherein:

the color image is updated at a frame rate of not less than 50 Hz;

each of the light valves in said matrix of light valves is a liquid crystal device, the light transmissive properties of which are externally controlled; and each of said liquid crystal devices includes a twisted nematic liquid crystal material sandwiched between first and second control electrodes which are separated by a distance of less than four micrometers.

11. The apparatus of claim 10 wherein the light transmissive properties of each of the light valves is controlled by an associated thin-film transistor.

12. Apparatus for generating a color image, comprising:

an image forming region comprising a matrix of liquid crystal light valves the light transmissive properties of which can be individually controlled wherein, single-color images representing separate components of the color image are formed by sequentially activating successive lines of light valves in the matrix of light valves;

first backlighting means including at least first and second light sources which may be sequentially and selectively activated to directly emit light of a first color to illuminate respective first and second distinct spatial locations corresponding to respectively different lines of said light valves synchronism with the sequential activation of the lines of light valves; and second backlighting means including at least first and second further light sources, interleaved with the first and second light sources, said first and second further light sources being sequentially and selectively activated to directly emit light of a second color, substantially exclusive of said first color, to illuminate respective ones of said first and second distinct spatial locations in synchronism with the sequential activation of the lines of light valves;

wherein, the first light source illuminates the first spatial location at the same time that the second further light source illuminates the second spatial location.

13. The apparatus of claim 12 wherein:

the light valves in said matrix of light valves are arranged in rows and columns and said images are formed by activating successive rows of light valves in said matrix.

14. Apparatus for generating a color image, comprising;

a display panel including a matrix of light valves having transmissive properties, wherein each of the light valves in said matrix of light valves is a liquid crystal device, the light transmissive properties of which are externally controlled;

means for selectively controlling the light transmissive properties of the matrix of light valves in the display panel wherein, single-color images representing separate components of the color image are formed by sequentially activating successive lines of light valves in the matrix of light valves;

a plurality of single color light sources wherein, each of said plurality of single color light sources includes a plurality of individual colored light sources which may be independently activated; and individual colored light sources of each one of said plurality of single color light sources are spatially interleaved with the individual colored light sources of the other ones of said plurality of single color light sources;

means for strobing the plurality of single color light sources to directly emit light for transmission through the matrix of light valves, wherein each of said single color light sources may be selectively activated to provide light in at least first and second distinct spatial locations corresponding to respectively different lines of said light valves; and means for activating each of the individual single color light sources to emit light of the single color at said first and second distinct spatial locations at respectively different times, in spatial correspondence with the scanning of the lines of the light valve matrix.

15. The method of claim 14 wherein the plurality of colored light sources of each of the plurality of single color light sources are configured to be alternately strobed in synchronism with the formation of single-color images on said matrix of light valves.

16. The method of claim 14 wherein each of said plurality of single color light sources includes a plurality of separately operable monochrome light sources and the separately operable monochrome light sources of said plurality of single color light sources are interleaved to provide illumination for said matrix of light valves.

* * * * *